United States Patent [19]

Klem

[11] 4,373,739
[45] Feb. 15, 1983

[54] AXLE BOLSTER PIVOT ASSEMBLY

[75] Inventor: John E. Klem, Waukegan, Ill.

[73] Assignee: International Harvester Co., Chicago, Ill.

[21] Appl. No.: 163,611

[22] Filed: Jun. 27, 1980

[51] Int. Cl.³ ............................................. B60G 5/00
[52] U.S. Cl. .................................... 280/111; 180/9.5; 280/677; 308/36.1; 384/147; 384/420
[58] Field of Search ................. 180/9.5; 280/111, 677; 308/36.1, 237 R, 135

[56] References Cited

U.S. PATENT DOCUMENTS

| | | | |
|---|---|---|---|
| 2,841,413 | 7/1958 | Pringle | 308/237 R X |
| 3,127,222 | 3/1964 | Hanson | 308/237 R X |
| 3,458,214 | 7/1969 | West | 280/677 |
| 3,884,535 | 5/1975 | Rich, Jr. | 308/36.1 |
| 4,101,180 | 7/1978 | Anderson et al. | 308/237 R X |
| 4,265,495 | 5/1981 | Backlin | 308/36.1 X |

Primary Examiner—Joseph Paul Brust
Attorney, Agent, or Firm—D. K. Sullivan; F. D. Au Buchon

[57] ABSTRACT

Incorporation of a spacing member in an axle supported bolster pivot assembly provides wear compensation means and allows the utilization of interchangeable inboard and outboard thrust bushings and wiper seals.

10 Claims, 1 Drawing Figure

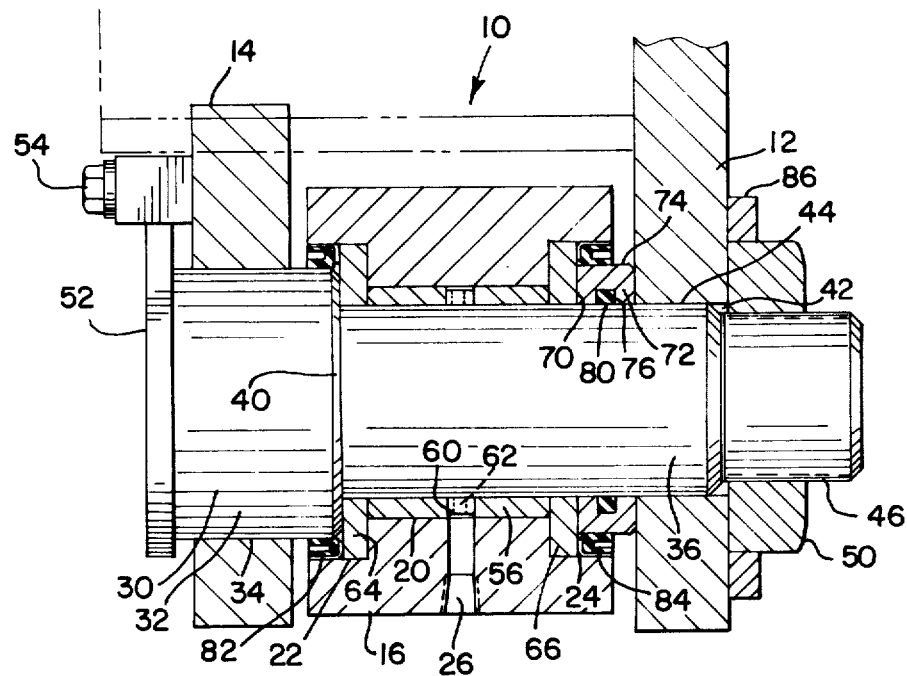

AXLE BOLSTER PIVOT ASSEMBLY

BACKGROUND OF THE INVENTION

1. Field of the Invention

This invention concerns the support assembly used in bolster frame axle supports as used on off highway construction equipment. More specifically, bolster pivot pin thrust and axial bushings and seals are involved.

2. Description of the Prior Art

Off highway construction equipment, particularly bucket equipped front end loaders having articulated main frames are often equipped with a suspended rear axle supported on a pivotally mounted rear axle bolster. The bolster is often a polygon having a forward transverse frame member and a rear transverse frame member having pivot pin mounting arrangements whereby a front and a rear pivot pin can be aligned on the longitudinal center line of the main frame of the vehicle. The rear axle bolster will be rotatable through a limited arc to allow one wheel of the vehicle to ride up over or down through a deviation in the supporting terrain.

The pivot pins are smooth surfaced stationary pins supported by main frame appendages that pass through the transverse frame members of the bolster. A bushing is usually provided and the pin surfaces are lubricated. At least one pin assembly (of the pair supporting the bolster) is provided with thrust washers to control longitudinal movement of the bolster relative to the main frame.

Prior art pin assemblies have the disadvantage of lack of part uniformity at respective inboard and outboard ends of the pin. That is, even though similar seals and thrust washers were used at both ends they were not interchangeable due to differing dimensional requirements.

Sealing of prior art pin assemblies have also been a problem. The bolster pivot pin operates in a very harsh and dirty environment. Seals would have the dual task of keeping the lubricant in place while at the same time keeping mud, water and other contaminents from getting to the bearing surfaces. Rope packing was utilized in prior art devices but would not perform as well as the lip seals utilized in the present invention. Prior art seals were also larger and thus less efficient at sealing than the relatively smaller seals that can be used with the instant invention.

SUMMARY OF THE INVENTION

An axle bolster pivot bearing and seal assembly incorporates a multi-diameter machined pivot pin fixed in the main frame of a construction vehicle with the pin aligned longitudinally on the longitudinal center line of the host vehicle. The attached bolster frame is provided with a bore to accommodated a bushing through which the pivot pin passes in a clearance fit to act as a bearing between the pin and the bolster. A thrust bushing is provided at respective inboard and outboard positions of the pin bushing. The outboard thrust bushing abuts a spacing member having a seal in contact with a second diameter portion of the bolster pin. The spacing member also acts to increase the effective diameter of the second diameter portion of the pin so that it is equivalent to the first diameter portion. Since the first diameter portion and the effective diameter of the second diameter portion are the same, identically dimensioned seals can be used in the assembly at both the inboard and outboard ends thereof. The seals used will prevent the entry of dirt and contamination into the bearing areas of the bolster pivot pin while maintaining a lubricant in the bearing area.

It is an object of this invention to provide an axle bolster pivot pin and bushing assembly wherein thrust bushings and grease seals are interchangeable between inboard and outboard ends of the assembly.

Another object of the invention is to utilize wiper seals in an axle bolster pivot to prevent the entry of dirt and contamination into the bearing surfaces of the assembly while restraining lubricant in the bearing area.

Another object of the invention is to provide a spacing member, having a separate seal, that positions a thrust bushing in proper location away from an adjacent supporting frame.

A further object of the invention is to provide an axle bolster pivot pin assembly wherein an improved seal and bearing structure can be provided for a lower cost than previous designs.

Another object of the invention is to provide an axle bolster pivot pin assembly that is easier to assemble than known assemblies.

These and other objects of the invention will be apparent from an understanding of the invention when explained in light of the attached drawing by the following description. The drawing FIGURE is a pivotally sectioned view of an axle bolster pivot pin incorporating the invention.

DETAILED DESCRIPTION OF THE INVENTION

The drawing FIGURE presents a cross sectional view of the bolster pivot in its usual environment. The bolster pivot would typically be installed between a pivoting axle supporting bolster and the main frame of a large excavating loader. The bolster is generally a structural frame having pivot pins mounted on the longitudinal center line of the vehicle and carrying an axle transverse to the longitudinal center line of the vehicle. The axle bolster structure is well known in the prior art and only the unique arrangement of the bearings and seals of this bolster pivot is covered by this disclosure.

The bolster pivot is shown generally as item 10 in the FIGURE. The main frame of the host vehicle is made up of a forward wall 12 and a rear wall 14 which are both transverse to the longitudinal axis of the vehicle. The bolster frame 16 is provided with a bore 20 as well as an inboard counterbore 22 and an outboard counterbore 24. The bolster frame is also provided with a lubricant access port 26.

The bolster is pivotally carried on bolster pivot pin 30 which is a stationary non-rotating member having a plurality of diameters including a first diameter portion 32 which is a clearance fit in a bore 34 of the main frame rear wall 14. A second diameter portion 36 of the pin 30 is smaller than the first diameter and extends from the shoulder 40 of the first diameter portion to a shoulder 42 of the second diameter portion 36.

The second diameter portion of the pin is a clearance fit in a bore 44 of the main frame forward wall 12. A third diameter portion of the bolster pivot pin 30 is a threaded portion to which a fastening nut 50 is threaded. The bolster pivot pin 30 is attached to pin retainer 52 which is in turn fastened by fastener 54 to the main frame forward wall 14.

The fastening nut may be adjusted on the third diameter portion of the pivot pin to urge the forward wall toward the main frame rear wall to adjust the thrust bushing compression of the assembly.

As the bolster frame 16 rotates on the bolster pivot pin in a limited arc a bushing 56 is carried in the bolster bore 20 and is a clearance fit on the second diameter portion 36 of the bolster pivot pin 30. The bushing 56 is a press fit in the bolster bore 20 and is stationary with respect to the bolster frame 16. Lubrication is supplied to the bushing 56/bolster pivot pin 30 interface through lubricant access port 26 which is aligned with a circumferential groove 60 in the bushing 56. A plurality of apertures such as 62 are provided through the bushing 56 from the groove 60 to the inside surface of the bushing to allow lubricant passage.

A pair of thrust bushings, an inboard one 64 and an outboard one 66 are positioned in respective inboard and outboard counterbores 22 and 24. The thrust bushings are a clearance fit on the second diameter portion 36 of the pin. Each thrust bushing has an inboard surface that faces the aligned plane of the bushing 56 ends and the bottom of the adjacent bolster counterbore. The outboard face of the inboard thrust bushing 64 has a portion of its face contacting the shoulder 40 between the first diameter portion 32 and the second diameter portion 36 of the bolster pivot pin 30 such that any thrust forces toward the pin retainer 52 is translated from the bolster frame 16 through the thrust bushing 64 to the bolster pivot pin 30 and then to the pin retainer 52 and main frame rear wall 14.

The outboard face of the outboard thrust bushing 66 has a portion of its face contacting an inboard bearing face 70 of a spacing member 72. The steel member 72 is a circumferential ring having an inside diameter that is a clearance fit on the second diameter portion of the bolster pivot pin 30. The outside diameter 74 of the spacer member 72 is machined so that the overall outside diameter of the pin 30 at the second diameter portion 36 with the outside diameter of the spacer member 72 will be very close or the same as the first diameter 32 of the bolster pivot pin 30. The width of the spacer member 72 is limited by the distance available between the main frame forward wall and the outboard surface of the outboard thrust bushing 66 after the bolster frame 16 and the thrust bushing have been installed on the pin. The spacing member 72 is also equipped with a circumferential groove 76 for accommodating a circumferential seal 80.

A first metal backed wiper seal 82 (or lip seal) is carried between the first diameter portion 32 of the bolster pivot pin 30 and the diameter of the inboard counterbore 22. A second metal backed wiper seal 84 is located between the outside diameter 74 of the spacing member 72 in the diameter of the outboard counterbore 24.

As lubricating grease is pumped into the lubricant access port 26 it will follow the surfaces between the bolster pivot pin and the bolster bushing 56 and lubricates the other clearance surfaces and face contact areas of the thrust bushings. The first and second metal backed wiper seals 82 and 84 will allow lubricating grease to flow outwardly at a designated grease pressure but will prevent the entry of dirt into the bearing surfaces of the bolster pivot bushing contact areas. Circumferential seal 80 in the spacing member 72 also prevents dirt and contaminants from getting into the bearing surfaces of the bolster pivot.

It is important to recognize that both the first 82 and second 84 metal backed wiper seals are identical parts as are the inboard 64 and outboard 66 thrust bushings. In prior art bolster pivot assemblies it is oftentimes necessary for the components at the inboard end of the pivot pin to be different from components at the outboard end of the pivot pin.

Each wiper seal comprises an L-shaped metal support extending from a front edge of the seal circumferentially and extending transversely along the back of the seal towards the axial center of the seal for less than the full width of the seal. The elastomeric sealing component of the wiper seal is a U-shaped element carried in the L-shaped metal support where one leg of the "U" contacts one leg of the "L" and the bottom of the "U" contacts the other leg of the "L". Both seals are located in position such that the open end of the U-shaped elastomeric portion faces outwardly, that is, away from the inboard and outboard thrust bushings. This allows the exclusion of dirt particles and the occassional passage of grease from the bearing surface area of the bushings outwardly when new grease is pumped into the lubricant access port periodically.

Spacing member 72 acts as a spacer to locate the bolster frame 16 generally between the main frame forward and rear walls. The spacing member also insures that the second wiper seal 84 is the same dimension as the first wiper seal 82.

The fastening nut 50 allows the thrust bushing clearances to be adjusted to compensate for wear as well as to provide the initial setting of clearances. The fastening nut retainer 86 is a plate bolted to the main frame forward wall 12 that has an aperture through it compatible with the hex shape of the fastening nut 50. When the fastening nut retainer 86 is in position—after thrust bearing clearances have been set—the fastening nut will not be rotatable on the third diameter threaded portion 46 of the pin 30.

Thus it is apparent that there has been provided in accordance with the invention a axle bolster pivot assembly that fully satisfies the objects, aims and advantages set forth above. While the invention has been described in conjunction with specific embodiments thereof, it is evident that various alternatives and modifications will be apparent to those skilled in the art in light of the foregoing description. Accordingly, this specification is intended to embrace all such alternatives and modifications as fall within the spirit and scope of the appended claims.

What is claimed is:

1. In an off-highway four wheel drive articulated loader having a main transverse frame and a rear axle bolster pivotally mounted to said main frame providing a rear axle suspension, the improvement comprising:

a rear axle bolster frame having a bore therethrough aligned with a transverse centerline of said main frame, said through bore provided with an inboard counterbore and an outboard counterbore;

a pivot pin disposed in fixed position in aligned bores of a forward wall and a rear wall of said main frame, said pivot pin having a first and a second diameter portion, said first diameter portion being larger than said second diameter portion and providing a shoulder between said first and second diameter portions, said first diameter portion being disposed in said bore of said rear wall and said second diameter portion being positioned in said through bore of said rear axle bolster, said second diameter portion also extending through said bore of said forward wall of said main frame;

a bushing located in said through bore of said bolster frame between said bolster frame through bore and said second diameter portion of said pivot pin;

an inboard thrust bushing and an outboard thrust bushing located respectively in the inboard and outboard counterbores of said bolster frame through bore;

a spacing member carried on said second diameter portion of said pivot pin between said outboard thrust bushing and said main frame forward wall, said spacing member having an outside diameter the same as said first diameter portion of said pin; and a pair of identical wiper seals, a first of said pair carried on said first diameter portion of said pivot pin in contact with said inboard counterbore and a second of said pair of wiper seals carried on said spacing member in contact with said outboard counter bore.

2. The invention in accordance with claim 1 wherein said bolster frame is provided with a lubricant access port leading to said through bore of said bolster frame.

3. The invention in accordance with claim 2 wherein said bushing in said through bore of said bolster frame is provided with a circumferential groove in its outer diameter aligned with said lubricant access port, said circumferential groove provided with an aperture to allow lubricant passage to an inside surface of said bushing.

4. The invention in accordance with claim 1 wherein said spacing member is provided with a circumferential groove on an inner diameter of said member and a circumferential seal is housed in said circumferential groove, said circumferential seal being in contact with said second diameter portion of said pivot pin.

5. The invention in accordance with claim 4 wherein said pair of wiper seals each comprise an "L shaped" metal support extending from a front edge of said seal circumferentially and extending transversely along the back of the seal toward the axial center of the seal for less than the full width of the seal, said wiper seal having a "U-shaped" elastomeric sealing component carried in said "L-shaped" metal support in contact with one leg and the base of said "U-shaped" elastomeric sealing component.

6. The invention in accordance with claim 5 wherein each of said wiper seals of said pair has the legs of said "U-shaped" elastomeric sealing component directed away from said inboard and said outboard thrust bushings.

7. The invention in accordance with claim 6 wherein said pivot pin is maintained in position in said aligned bores of said forward and rear walls of said main frame through the use of a pin retainer abutting the first diameter portion of said pin, said pin retainer fastened to said main frame rear wall, and a fastening nut threaded onto a third diameter portion of said pivot pin outboard of said main frame forward wall.

8. The invention in accordance with claim 7 wherein said pin retainer is fastened to said large diameter portion of said pivot pin and said fastening nut may be adjusted on said third diameter portion of said pivot pin to urge said main frame forward wall toward said main frame rear wall.

9. The invention in accordance with claim 8 wherein said inboard and said outboard thrust bushings are interchangeable.

10. The invention in accordance with claim 8 wherein said inboard thrust bushing abuts the shoulder of said first diameter portion of said pivot pin and the bottom surface of said inboard counterbore of said bolster bore and said outboard thrust bushing abuts a bottom surface of said outboard counterbore and an inboard face of said spacing member.

* * * * *